(12) United States Patent
Yuri et al.

(10) Patent No.: US 6,875,363 B2
(45) Date of Patent: Apr. 5, 2005

(54) PROCESS AND DEVICE FOR THE TREATMENT OF WATER, PARTICULARLY FOR SHIPS

(75) Inventors: Kolodny Yuri, Tel Aviv (IL); Kreisel Itay, Haifa (IL)

(73) Assignee: Arkal Filtration Systems C.S. LTD, Emek Hayarden (IL)

( * ) Notice: Subject to any disclaimer, the term of this patent is extended or adjusted under 35 U.S.C. 154(b) by 52 days.

(21) Appl. No.: 10/325,769

(22) Filed: Dec. 19, 2002

(65) Prior Publication Data

US 2004/0026336 A1 Feb. 12, 2004

(30) Foreign Application Priority Data

Aug. 8, 2002 (IL) .................................. 151146

(51) Int. Cl.⁷ ............................... C02F 1/32; C02F 1/72
(52) U.S. Cl. .................... 210/748; 210/759; 210/791
(58) Field of Search ................................ 210/748, 758, 210/759, 764, 767, 791, 198.1, 205; 422/24, 186.3

(56) References Cited

U.S. PATENT DOCUMENTS

| | | | |
|---|---|---|---|
| 5,139,679 A | | 8/1992 | Pan et al. |
| 5,256,423 A | | 10/1993 | Egusa et al. |
| 6,083,398 A | * | 7/2000 | Pittroff et al. ............... 210/626 |
| 6,090,296 A | * | 7/2000 | Oster ......................... 210/748 |
| 6,626,122 B2 | * | 9/2003 | O'Reilly et al. .......... 114/74 R |
| 2002/0030011 A1 | | 3/2002 | Constantine et al. |

FOREIGN PATENT DOCUMENTS

| | | |
|---|---|---|
| DE | 19919824 | 11/2000 |
| JP | 4322788 A2 | 11/1992 |

* cited by examiner

Primary Examiner—Frank M. Lawrence
(74) Attorney, Agent, or Firm—Roach Brown McCarthy & Gruber, P.C.; Kevin D. McCarthy

(57) ABSTRACT

A process for the treatment of water comprises: a) Adding to the water an oxidizing agent in a stunning concentration, wherein the detention time of said agent between adding it to water and the subsequent steps of filtration and/or irradiation is up to about 90 seconds; b) filtering the oxidized water by a filtration system having a filtering size larger than the average size of suspended organic matter in the water; and c) exposing the oxidized and filtered water to irradiation.

24 Claims, No Drawings

PROCESS AND DEVICE FOR THE TREATMENT OF WATER, PARTICULARLY FOR SHIPS

FIELD OF THE INVENTION

The present invention relates to the purification of sea water, particularly sea water employed on ships, such as ballast water. More particularly the invention relates to a process that combines a number of steps, which are initiated by a well-defined oxidation step, which is then followed by filtration, and irradiation by UV.

BACKGROUND OF THE INVENTION

Ships employ water for a variety of uses, such as drinking, washing and operating the ship. One particularly important use of water in a ship is as ballast water and, because of its great importance, marine ballast water will be used hereinafter to illustrate the invention, it being understood the reference to ballast water throughout this specification is not meant to limit the invention in any way to a use in respect of any specific type of water. Typical types of waters and uses in ships are briefly summarized below:

A) Ballasting—water used to assure ship stability, trim, and effective immersion of ship propellers for efficient propulsion.

B) Washing of tanks, holds, and other cargo spaces. Such sea waters must be cleaned before discharge.

C) Distillation or fresh water—such sea water must be properly treated to assure the effective performance of distillation processes, particularly in low temperature high-vacuum distillers.

D) Sanitary water on ships is always provided by sea water. Shipboard seawater-based sewage requires special treatment of the intake water.

E) Cooling sea water for engines, condensers and other ship-borne equipment. Such waters must be treated for effective operation of the equipment.

F) Bilge and Fuel/Lube Oil Tank washing sea water. Such oily water must be filtered, treated and separated. Treatment can be performed before or after ceasing operation and oil can be separated from the water afterwards.

G) Numerous uses of fresh water, which is stored in fresh water tanks for lengthy periods of time and must be filtered and treated before use to eliminate tank wall contaminants such as water-borne species remaining after washing with sea water.

The invention is directed, inter alia, to all such types of water and others not mentioned above, and it is not limited to any specific type of water. Whenever reference is made to ballast water, it is meant to cover all such types of waters. It is understood that ballast water is employed only as the representative and non-limiting example of treated water.

As said, a ship without load is usually loaded with ballast water to better balance it. The ballast water is pumped up from the sea at one location, and pumped out back into the sea at another location, according to the need. The release of non-indigenous marine organisms, whether marine organic material, e.g. worms, spores, bacteria, viruses plankton (zooplankton or phytoplankton) or larger organisms, with large volumes of ballast water, can have damaging ecologic and economic consequences, and therefore purification procedures are required. Another problem is a deposit build-up in the ballast tank due to the action of said organic materials and other polluting material waste, particularly microorganisms.

Methods currently used for the purification of ballast water employ nearly all conventional technologies that are used in water purification, and usually relate to the removal of a specific contaminant. Japanese patent publication JP 4322788 relates to a method and device for destroying cysts of harmful algae in ballast water by using a chlorine-based microbiocide or hydrogen peroxide. U.S. Pat. No. 5,256,423 discloses a method for destroying cysts of noxious plankton, comprising introducing hydrogen peroxide into the ballast water to reach a concentration from 10 to 500 ppm, and holding said concentration for a period of 3 to about 48 hours. U.S. patent application Ser. No. 2002/0030011 describes an apparatus and method for treating water to be used as ballast water, comprising the centrifugal separation of sediment, followed by the UV-irradiation of the partially processed water.

The methods relating to a specific contaminant, do not take into consideration the possibility that certain, non-targeted, organisms may have a detrimental effect on the biological habitat because of trans-contaminations by ballast water. On the other hand, large amounts of biocides may present biological hazards, or can damage the ballast water tank in the long term, and therefore long reaction times, involving the presence of relatively highly corrosive species, may be impractical. Some methods cannot be scaled-up to provide a practical means for today's ships which may use tens of thousands of tons of ballast water.

It is an object of the present invention to provide a novel and improved process and system for the purification of water.

It is another object of the invention to provide a process and efficient system for the purification of ballast water which will act on substantially all potentially detrimental organisms.

It is yet another object of the invention to provide a process for the purification of ballast water that can be scaled-up.

It is still another object of the invention to provide a process for the purification of ballast water which does not cause a contamination of the sea pathways by excessive amounts of biocides.

It is a further object of this invention to provide a process for the purification of ballast water which employs the synergistic effect of three combined processes, namely oxidation, filtration, and UV-radiation.

It is still a further object of the present invention to provide a process for the purification of ballast water in which the total concentration of the oxidant in the tank is kept low at all times The present invention also aims at providing a compact device for the purification of ballast water that can be employed before, after, and during the ship's voyage.

It is also a further object of the invention to provide an apparatus that can be built modularly, to accommodate different or changing needs.

Other objects and advantages of the invention will appear as the description proceeds.

SUMMARY OF THE INVENTION

The invention relates to a process for the treatment of water comprising:

a. Adding to the water an oxidizing agent in a stunning concentration, thereby creating free radicals, wherein the detention time of said agent between its introduction into the water and the subsequent steps of filtration and/or irradiation is up to about 90 seconds, typically about 4–90 seconds;

b. filtering the oxidized water by a filtration system having a filtering size larger than the average size of suspended organic matter in the water; and c. exposing the oxidized and filtered water to irradiation, and optionally collecting it in a tank wherein no residual effect is observed after approximately 24 hours.

The term "stunning concentration", as used herein, and as will become apparent hereinafter, is meant to refer to a concentration of oxidizing agent which is insufficient to kill the organisms present in the water, but is sufficient to deactivate them (as will become apparent to the skilled person), by creating a state of anabiosys therein. Without wishing to be bound by any particular theory, the inventor believes that it is this unique process, involving free radicals, that renders the organic matter adhesive and permits it to aggregate on a filter of size larger than the particle's size, viz., surprisingly to be captured by the filter rather than passing through it. The term "detention time", as used herein for the oxidizing agent forming free radicals, is meant to refer to the time in seconds during which the agent affects the water during its flow between the injector of the agent and the filtration device, or the irradiation device. Said detention time is defined as V/v, wherein V is the volume in liters of the space between the injector and the filtration device, or between the injector and the irradiation device, respectively, and v is the flow rate of water in liters per second.

According to a preferred embodiment of the invention the irradiation is a UV radiation. According to another preferred embodiment of the invention the filtration system comprises disk filtering means.

The invention finds a particularly important use in a process utilizing sea water, making use of its high salt concentration, especially when the water is to be used as ballast water.

According to a preferred embodiment of the invention the process comprises:

a. Adding said oxidizing agent to the water in a concentration of up to about 50 ppm, typically from 10 ppm to 50 ppm;

b. filtering said water by a filtration system comprising at least one filter having a nominal filter size from 20 $\mu$m to 130 $\mu$m; and c. exposing the oxidized and filtered water to UV radiation the spectrum of which has the maximum energy at a wavelength from 150 nm to 300 nm, thereby lowering the bacterial count to 5% or less of the original count.

According to a preferred embodiment of the invention the process reduces the quantity of colony forming units in the treated water to a value lower than 10 cfu/100 ml.

While many different oxidizing agents can be employed, the most common one—and one of the most preferred for the purposes of the invention—is hydrogen peroxide.

Without wishing to be bound by any specific theory, the inventor believes that the surprising result obtained may be connected to a process wherein contacting the water with the oxidizing agent causes the creation of strong aggregates of organic matter, which leads to the retention on filters of particles whose original size was small enough to pass through said filters. Prior art processes are also known to generate aggregates of organic particles under oxidation conditions. However, the aggregates so formed are very weakly held together and, therefore, break up and easily escape through filters. In the process according to this invention, the special effect of the filtration enables enhancing the activity of free radicals during and/or after the subsequent irradiation step.

The filter can be of any suitable type, especially a mechanical automatic back flushed type filter. Illustrative and non-limitative examples of suitable filters include disc filter, screen filters and mesh filters.

According to a preferred embodiment of the invention the concentration of hydrogen peroxide in the water to which it is added is in the range from 10 ppm to 50 ppm.

The invention also encompasses apparatus for the purification of water comprising:

a. Means for adding to the water an oxidizing agent in a stunning concentration, and means for providing a detention time of said agent, between its introduction and the subsequent steps of filtration or irradiation, of up to about 90 seconds, typically about 4–90 sec;

b. filtering means having a filtering size larger than the average size of suspended organic and non organic matter in the water, to filter the oxidized water; and c. A source of radiation to expose the filtered water to radiation.

DETAILED DESCRIPTION OF THE INVENTION

Illustrative and non-limitative conditions for carrying out the process of the invention with $H_2O_2$ are a stunning concentration from 10 ppm to 50 ppm, and a detention time from 4 sec to 60 sec. The purification rate is characterized, physico-chemically, by the quantity of removed suspended solids (in %) and, biologically, by the number of colony-forming units (in cfu/100 ml). Therefore, the value of cfu/100 ml is a good measure of the total number of surviving organisms.

The detention time, corresponding approximately to the contact time between free radicals and the components dissolved or dispersed in the water, e.g., ballast water, is dependent on the ratio V/v, wherein V is the volume in liters of the oxidation reactor, and v is the flow rate of water through the reactor in liters per second. The simplest reactor is a section of tubing between peroxide injector and the mechanical filter, where the volume of this part of the tubing corresponds to the said value V. It was found that even a detention time as low as 5 seconds yielded a surprisingly high extermination efficiency for bacteria, lowering the amount of bacteria in the water from 200 cfu/100 ml to 5 cfu/100 ml, for a peroxide concentration of 35 ppm.

It can be noted that conventional technologies that use biocide properties of $H_2O_2$ typically employ a contact time of about 30–90 minutes to eliminate bacteria. Such conventional technologies are aimed at the complete killing of microorganisms, while the process according to the present invention aims at the destruction of the easily oxidized part of the organic contaminants present in seawaters, including anthropogenic remnants, phytoplankton and zooplankton, which account approximately for 50% of the total organic substances contained in seawater. Parts of the organics are present in finely dispersed and colloidal forms. In the process of destruction under the action of $H_2O_2$, coagulation occurs simultaneously with the oxidation, resulting in the production of an oxidized biomass which serves as the basis for further aggregation, since the oxidized organics possess high adhesion power. When studying these aggregate compositions under a microscope, it was found that they contain not only oxidized and inert biomass but also included inorganic particles as well as live microorganisms. This oxidation-sorption interaction improves the efficiency of the filtration step that follows.

Said oxidation reactor can have the form of a section of tubing the volume of which ensures the required detention time, or it can have any other suitable shape. All the tubes, through which the water is driven to the filtration system, as well as the oxidation reactor, form a closed system. The sea water, in which aggregation was initiated with a low peroxide concentration, is pumped through the filtration system, which comprises at least one mechanical filter of nominal size from 20 $\mu$m to 130 $\mu$m. The filtration system may comprise any suitable mechanical automatic back flushed type of filter, e.g. disc filters, and their combination, or a battery of filters. One preferred filter for this purpose is the patented Spin Klin disc filter manufactured by Arkal Filtration Systems, Israel. The effect of the filtration is increased by the above described agglomeration phenomenon, and the filtration is thus successful in removing large quantities of particles the original size of which, before aggregation, was small enough to pass through the filters. In a typical sea water sample, suspended solids may have a concentration from 2 to 20 mg/ml, of which between 20% to 60% are usually retained on filters. In one preferred embodiment of the invention, spinning disc filters are provided with a rinse system that prevents accumulations of sediments and improves the filter performance. The filtered water passes to a low pressure part of the whole system, and continues through a source of radiation, e.g. a UV source. UV (as well as other) radiation enhances the concentration of free radicals from remaining $H_2O_2$ which destroy organisms remaining in the water. The radiation thus acts in a double mode, killing the organisms directly by damaging their DNA, and indirectly, via the enhanced free radicals, which increases the efficiency of the radiation in the process of this invention when compared to the use of UV alone. The effect of UV radiation depends strongly on the transparency of the water, and on its UV transmittance. The above-described step of efficient filtration, which in itself is enabled by the previous step of peroxide-caused aggregation, substantially increases the effect of the irradiation step thereby sharply decreasing the amount of living organisms in the water. The increase of UV efficiency in the process of this invention reduces the demand on UV equipment, and can contribute to the reduction of the size and energy consumption of the whole device.

Among other tests, the process of the invention was tested using a pilot system placed on a towing dock in a port on the eastern Mediterranean coast. The flow rate of the sea water to the filters was 10,000 liters/hour. The total quantity of water pumped through the filters in several experiments was greater than $10^4$ metric tons. Hydrogen peroxide, 33%, was continuously injected into the system at a flow rate of about 0.3–1.5 l/hr. The mean final concentration of peroxide in the oxidation reactor was from 10 to 50 ppm. Two oxidation reactors were tested, a "short" and a "long", realized by a pipe about 2.2 m and 20 m long, respectively. The detention times in these reactors were about 5 sec and 48 sec, respectively. The redox potential was measured along the flow line, in order to test the influence of increased contact time on the creation of free radicals in the water. The filtration was carried out using either one or two Arkal SK disc filters (manufactured by Arkal Filtration Systems, Israel), having nominal size 55 $\mu$m or 100 $\mu$m. The pressure before the filters was from 3 to 3.5 atm. The filters were provided with a rinse system, comprising a rinse tank with air pressure activation. The period between rinses was from 10 to 60 minutes. The sediment on the filters was sampled and analyzed. Water passed from the filters to a UV irradiation unit. Various types of sources were compared. A decrease in radiation intensity was observed in some cases. However, when a built-in automatic wiping system was introduced, the radiation intensity was maintained at 100% throughout the entire period of operation. The system was operated continually for up to 300 hours. The extermination of bacteria in various experiments reached from 96% to 99%.

The process according to the invention permits taking advantage of free radicalization potential for elimination of most of the organisms in the ballast water and other sea water uses, without bringing relatively high concentrations of peroxide in contact with either the whole volume of the ballast water, or the container for said ballast water. The oxidation process in the process according to this invention utilizes an enormous amount of free radicals, the concentration of which is enhanced by the irradiation process. This results in zero peroxide concentrations in said container approximately 24 hours after finishing the process, with all the resulting advantages, such as lower corrosion, which is a major issue in ship tanks. The process according to the invention was tested in a 10 $m^3$/hr pilot plant system, and provided water that could be used as ballast water without causing contamination of the sea pathways by any potentially detrimental organisms or by biocidal materials.

Although the described process and device were developed for the purpose of processing ballast water, they potentially enable the processing of other water streams, including high organic or high heavy metals concentration waste waters, municipal effluents waste water for agricultural use or other industrial waters intended either for further use or for discarding. Additionally, all that is said herein in respect to ballast water flowing into a ship's tank applies, mutatis mutandis, to the discharge of ballast or other water from a ship's tank.

The invention will be further described and illustrated by the following examples:

EXAMPLES

Materials and General Procedures

Filters:
Arkal filters were used: model 3*2" S.K. Filters Plastic, "A.A.F" Battery.

Measurements:
Oxidation power was measured by measuring redox potentials in mV, using Hanna Instruments pH/T/ORP-meter 8424;

Turbidity was measured by Accu4TM Low Range Turbidimeter System, with Model T53 Analyzer and 8320 Sensor;

Sediment deposit was characterized by the pressure gradient on the filter;

The bacterial count, expressed as cfu/100 ml, was measured according to Standard Methods of Water and Wastewater, Heterotrophic Plate Count 9215 B (20th ed);

The quantity of suspended solids (Total Suspended Solids=TSS) was measured by filtering a volume of about 10 liters of water through a standard glass-fiber filter, and calculating the dry weight of the retained solids, and their concentration in mg/l, according to Standard Methods of Water and Wastewater, 2540 D (20th ed).

Example 1

The system that was used for the purification of the sea water consisted of the following parts:

Pump—The pump was submerged to the desired depth, about 6 meters, using an external crane. A pump manufactured by Zenit (Italy) was used—submersible electro pump, model AP550, capacity 10 $m^3$/hr at 3.8 atm, 4.9 kW.

Oxidation reactor—Polypropylene pipe, the internal diameter 90 mm. Two different pipes were employed, either 20 m long, or 2.2 m long, providing the detention times 48 sec, and 5 sec, respectively.

Filters—The system consisted of one disc filter (described above) or two filters in parallel, either 55 or 100 micron, and a rinse system. The period between rinses was set between 10 to 60 minutes. The discs were sampled and tested in a laboratory.

Uv Sources— a) Wedeco Mini-Pe Model M-2PE/100. Polyethylene body, 2 UV lamps, 65W, UV dosage at 10 m$^3$/hr 33 mJ/cm$^2$.

b) Berson Inline 400. Stainless steel body, 2 UV lamps (model B2020), UV dosage at 10 m$^3$/hr 400 mJ/cm$^2$.

In some of the tests with Wedeco, a reduction in intensity occurred. Wiping the quartz sleeves of the lamps raised the measured intensity back to its initial value. The intensity was measured by a special optic detector built in the irradiation chamber.

The Berson Inline 400 projector has a built-in automatic wiping system which is operated an average of once an hour maintaining the radiation intensity at 100% throughout the entire period of operation.

Peroxide Dosing Pump—Jesco, Magdose DE-02 was used to supply 33% hydrogen peroxide at the inlet of the oxidation reactor. By changing the flow rate (between about 0.3 and 1.5 l/hr), the mean peroxide concentration in the oxidation reactor was adjusted to be between 10 and 50 ppm.

The pressure before the filters, measured by manometer, had a value between 2 and 3.2 atm.

The results of 6 runs are summarized in Table 1.

TABLE 1

| | | | Suspended solids | | |
| --- | --- | --- | --- | --- | --- |
| | Bacteria count (cfu/100 ml) | | Removed % in treated | TSS, mg/l, in untreated | |
| Test | Outlet | Inlet | water | water | Configuration |
| 1 | 47 | 146 | 46 | 4.8–15 | 2*55 PP without hydrogen peroxide, Wedeco/Berson projectors |
| 2 | 5 | 203 | 17 | 2.3–5.0 | 2*55, PP, 25 PPM short oxidation reactor, Berson |
| 3 | 4 | 75 | 38 | 5.8 | 2*55, PA, 35 PPM, short oxidation reactor, Berson |
| 4 | 3 | 149 | 42 | 5.2 | 2*55, PP, 35 PPM, long oxidation reactor, Berson |
| 5 | <1 | 123 | 34 | 3.2 | 1*55, PP, 40 PPM, long oxidation reactor, Berson |
| 6 | – | – | 29 | 2.1 | 1*100, PP, 20 PPM, long oxidation reactor, Berson |

In the six tests, the system was checked in continuous performance. During the tests no. 1 to no. 6, the following amounts of the sea water were processed: 1800, 2310, 3480, 3500, 3740, and 5180 m$^3$, respectively. The results show that the injection of hydrogen peroxide into the system increases the percentage of bacterial extermination from 57% to 96–99%. The bacterial count in the outlet water does not reflect the count in the inlet water. The hydrogen peroxide system exterminates most of the bacteria, regardless of the incoming quantity. The test of free radicals showed a concentration rise along the reactor. Reducing the contact time from 48 to 5 seconds caused a reduction of 40% in free radical development, as measured at the filter inlet. UV radiation caused a raise of the redox potential, indicating an increase of about 10% in the oxidation strength.

Example 2

Fifteen treated samples (50 ppm peroxide, 55 micron filtration) and 6 untreated control samples were each divided into two sterile Petri dishes and cultivated in ambient conditions. After one week, a yeast suspension was added to one subsample of a pair, to enhance growth. Thirty-eight living protist taxa, representative of oligotrophic habitats, were identified in the control samples, but none of the treated samples contained living eukaryotes, only loricae and empty valves of dinoflagellates. Two weeks after the start of the experiment, living protists from the control samples were added to the b-1 replicates of every treatment series. The motile activity of the living protists was impaired immediately, and a week later they were nearly extinct.

While this invention has been described in terms of some specific examples, modifications and variations are possible. It is therefore understood that within the scope of the appended claims, the invention may be realized otherwise than as specifically described.

What is claimed is:

1. A process for the treatment of water comprising:
    a. adding to the water an oxidizing agent in a stunning concentration, wherein the detention time of said agent between adding it to water and the subsequent steps of filtration and/or irradiation is up to about 90 seconds;
    b. filtering the oxidized water by a filtration system having a filtering size larger than the average size of suspended organic matter in the water; and
    c. exposing the oxidized and filtered water to irradiation.

2. A process according to claim 1, wherein the irradiation is a UV irradiation.

3. A process according to claim 1, wherein the filtration system comprises disk filtering means.

4. A process according to claim 1, further comprising periodically cleaning the filtering means of the filtration system to remove aggregates that have formed therein.

5. A process according to claim 1, comprising:
    a. Adding said oxidizing agent to the water in a concentration of up to about 50 ppm;
    b. filtering said water by a filtration system comprising at least one filter having a nominal filter size from 20 $\mu$m to 130 $\mu$m; and
    c. exposing the oxidized and filtered water to UV radiation the spectrum of which has the maximum energy at a wavelength from 150 nm to 300 nm, thereby lowering the bacterial count to 5% or less of the original count.

6. A process according to claim 1, wherein the bacterial count is lowered to 5% or less.

7. A process according to claim 1, wherein the quantity of colony forming units in the treated water is lower than 10 cfu/100 ml.

8. A process according to claim 7, wherein the quantity of colony forming units in the treated water is lower than 5 cfu/100 ml.

9. A process according to claim 1, wherein the quantity of suspended organic matter retained by the filtration system is at least 20% more than of the quantity in solely filtrated water on a per volume water basis.

10. A process according to claim 1, wherein the oxidizing agent is hydrogen peroxide.

11. A process according to claim 1, wherein contacting the water with the oxidizing agent causes the aggregation of organic matter, which leads to the retention on filters of particles whose original size was small enough to pass through said filters.

12. A process according to claim 1, wherein the filtration system comprises an item chosen from disc filter, screen filter and mesh filter.

13. A process according to claim 10, wherein the concentration of hydrogen peroxide in the water to which it is added is in the range from 10 ppm to 50 ppm.

14. A process according to claim 1, wherein the detention time is from 4 to 60 seconds.

15. A process according to claim 1, wherein the nominal filter size is from 50 $\mu$m to 130 $\mu$m.

16. A process according to claim 1, wherein the UV radiation has a spectrum having the maximum energy at a wavelength from 150 nm to 300 nm.

17. A process according to claim 1, wherein the water is selected from ballast water, tank or hold washing water, sanitary water, engine cooling water, deoiled bilge or oily water for distillation.

18. A process according to claim 1, wherein the water produced is purified such that it cannot contaminate the sea pathways by any potentially detrimental organisms.

19. Apparatus for the purification of water comprising:
  a. means for adding to the water an oxidizing agent in a stunning concentration, and means for providing a detention time, of said agent between its introduction into the water and the subsequent steps of filtration and/or irradiation, of from 4 seconds to 90 seconds;
  b. filtering means having a filtering size larger than the average size of suspended organic matter in the water, to filter the oxidized water, and
  c. a source of radiation to expose the filtered water to radiation.

20. Apparatus according to claim 19, wherein the source of radiation is a source of UV radiation.

21. Apparatus for the purification of sea water comprising:
  a. a pump capable to drive sea water from the depth of at least 6 m;
  b. an oxidation reactor into which an oxidizing agent is injected so that the mean concentration thereof in said reactor is from 10 to 50 ppm;
  c. a filtering system, comprising at least one filter of a nominal size from 50 $\mu$m to 130 $\mu$m;
  d. an injector for the oxidizing agent, enabling either the continuous or the dosed addition of peroxide to said oxidation reactor; and
  e. a UV-irradiation system comprising a UV radiation source and a part of a tubing system through which the irradiated water flows.

22. Apparatus according to claim 19, wherein a pump drives water from the sea, or from a ballast water container in case of recirculation, through an oxidation reactor, filters, and a UV irradiation unit, wherein pipes through which the water is driven to the oxidation reactor and a filtration system form a closed, pressure tight system, provided with safety valves.

23. Apparatus according to claim 21, wherein said pump drives water from the sea, or from the ballast water container in case of recirculation, through said oxidation reactor, said filters, and said UV irradiation unit, wherein the pipes through which the water is driven to the oxidation reactor and the filtration system form a closed, pressure tight system, provided with safety valves.

24. A process according to claim 1, wherein the water is sea water.

* * * * *